United States Patent [19]
McAmish et al.

[11] Patent Number: 5,910,225
[45] Date of Patent: Jun. 8, 1999

[54] FILM AND NONWOVEN LAMINATE AND METHOD

[75] Inventors: Larry H. McAmish, Cornelius, N.C.; Richard L. Ferencz, Isle of Palms, S.C.; Gregg T. Wilkinson, Nashville, Tenn.

[73] Assignee: Chicopee, Inc.

[21] Appl. No.: 08/951,687

[22] Filed: Oct. 16, 1997

[51] Int. Cl.⁶ .................................................. B32B 31/00
[52] U.S. Cl. ......................................... 156/229; 156/324
[58] Field of Search ..................... 156/229, 324, 156/494; 428/315.5, 315.7, 315.9

[56] References Cited

U.S. PATENT DOCUMENTS

| | | | |
|---|---|---|---|
| 2,945,283 | 7/1960 | Harmon et al. | 28/103 |
| 3,208,100 | 9/1965 | Nash | 26/106 |
| 3,745,057 | 7/1973 | Loft et al. | 428/44 |
| 3,870,593 | 3/1975 | Elton et al. | 602/58 |
| 4,308,303 | 12/1981 | Mastroianni et al. | 428/90 |
| 4,877,679 | 10/1989 | Leatherman et al. | 428/224 |
| 4,878,974 | 11/1989 | Kagawa | 156/85 |
| 5,032,450 | 7/1991 | Rechlicz et al. | 428/196 |
| 5,036,551 | 8/1991 | Dailey et al. | 2/167 |

*Primary Examiner*—James Sells
*Attorney, Agent, or Firm*—Juettner Pyle Piontek & Underwood

[57] ABSTRACT

A nonwoven porous fabric is laminated to a thermoplastic film, with the film being capable of rendered microporous upon permanent elongation. The film and fabric laminate is then heated and elongated, causing the fabric and film to become thinner and to cause the film layer to become microporous.

8 Claims, No Drawings

FILM AND NONWOVEN LAMINATE AND METHOD

BACKGROUND OF THE INVENTION

This invention relates to a film and nonwoven fabric laminate and method for making the same.

Nonwoven fabrics typically comprise polymer fibers or filaments which are bonded or consolidated by processes other than weaving. A variety of processes are employed, including thermal bonding, chemical or adhesive bonding, ultrasonic bonding, and entanglement using barbed needles or fine water jets. Nonwoven fabrics are employed in a wide variety of applications, with the fabric often being designed to have particular properties.

Nonwoven fabrics are generally porous and have poor barrier properties to liquids. Barrier properties can be improved by treatment of the nonwoven with water repellents, such as fluorocarbon compounds. Also, it is known to laminate a barrier film onto a nonwoven fabric, either by using an adhesive between the layers, or by extrusion coating of a film onto the fabric to obtain a thermal bond. The film layer generally renders the laminate impermeable to the passage of gas, liquids and vapor.

The production of microporous and porous films is also known. A microporous film is characterized as having a pore size which is small enough to prevent transfer of liquids but large enough to permit transfer of gas and liquid vapors. The manufacture of microporous films is described in U.S. Pat. Nos. 3,745,057 and 3,870,593. The methods employed in these patents involve the hot elongation of a film of thermoplastic polymer. The elongation itself may result in pores, but preferably, the polymer will contain a pore forming material, such as a finely powdered salt, such that pores will form at particle sites when the film is stretched or elongated in the machine direction, cross machine direction, or both directions. As described in U.S. Pat. No. 4,308,303, after production of the microporous film, it may be coated with fibers using a suitable adhesive. The microporous film may also be laminated to a finished nonwoven web using conventional techniques.

There are many present and future applications for breathable nonwoven fabrics. Such fabrics have a soft, fabric-like surface on at least one side, are substantially impervious to liquids, especially water and solvents, but allow passage of liquid vapors. Present commercial uses for such fabrics include outer covers for disposable absorbent garments such as diapers, other garments, such as hospital gowns, rain wear, and other protective clothing, covers, barrier fabrics for buildings and the like.

Up to the present, the manufacture of nonwoven and microporous film laminates has required the separate fabrication of the film and the finished nonwoven, followed by subsequent lamination, with each step adding to the cost of the final product.

SUMMARY OF THE INVENTION

In accordance with the present invention, a microporous film and nonwoven fabric is made in a two step process in a single production line. A film is first laminated to a nonwoven fabric, such as by extrusion coating the film onto the fabric. The film is capable of being rendered at least microporous upon elongation, and may contain powdered additives for this purpose. At this stage, the film is impermeable to liquids and vapors.

Upon lamination, the film and nonwoven composite is heated and stretched or elongated in the machine direction, cross machine direction, or both. This operation causes elongation and thinning of both the nonwoven and film layers and causes pores to be formed in the film layer. Upon cooling in the elongated state, no additional operations are required, and the resulting laminate is ready for conversion into commercial products.

The product of the present invention comprises a permanently drawn composite of a nonwoven web and film, wherein the composite is substantially impervious to transfer of liquids and is pervious to the transfer of vapor.

DETAILED DESCRIPTION

The nonwoven fabric used in the present invention may be of any of the variety known in the art. These fabrics are made from filaments or fibers which are formed into a web and then bonded in some fashion. Spunbonding is a process in which a large number of the filaments are extruded, drawn, deposited on a conveyor in the form of a web, and then bonded. Nonwoven fabrics made from fibers are usually formed into a web using carding machines. Depending on the type of fibers used, the web can be bonded by a variety of techniques. One technique involves the use of a heated engraved calender to form a pattern of thermal point bonds in the fabric. Direct heating is also employed. Other bonding processes include physical entanglement of the fibers such as by needling or hydroentanglement. The degree of bonding may vary widely, and, in general, a low degree of bonding may aid in the subsequent heat drawing step described herein.

One necessary characteristic of the fabric is that it must be capable of elongation of up to at least 50% in at least one direction. Elongation can occur by use of thermoplastic fabrics, such as polyolefins, which can be heated to a softening temperature and drawn, thereby increasing surface area. Other fabrics which are not thermoplastic, and which, for example are lightly bonded, may be permanently elongated simply by drawing or stretching, which can be usefully employed with fabrics having higher melting points, such as polyester or polyamide, as well as natural fabrics such as cotton.

The types of polymers used in the nonwoven fabric and film may also vary. The preferred polymers are thermoplastic in nature. The most preferred polymers are polyolefins such as polyethylene and polypropylene. Preferably, the film is capable of being hot extruded onto the fabric so as to permanently thermally bond with the fabric. Less desirably, the film may be laminated to the fabric using an adhesive such as a hot melt. Use of adhesive would allow processing of polymers having higher melting points such as polyester and polyamide. Bicomponent fibers and filaments may be used, as well as various mixtures of fibers and mixtures of fibers having the same or different deniers. For example, a polyethylene film can be extruded onto a surface of a spunbond or calendered fabric containing, for example, polypropylene or polyethylene fibers, or bicomponent fibers having an outer polyolefin component. The only limitation is that the fabric be capable of equal elongation with the subsequently applied film. This factor is determined by the thermal softening point of the fibers or filaments, the degree of bonding in the fabric, the basis weight of the fabric, and other factors, such as the denier of the fibers. These factors are not believed to be critical for most types of nonwovens, since an elongation of 50 percent or less and up to 150 percent or more will normally be sufficient, although higher elongations are contemplated.

In view of the above considerations, the properties of the nonwoven fabrics may vary widely. For example, fabrics having a starting basis weight of from about three to about fifty or more grams per square meter and having a stating denier in the fiber or filament of from 0.5 to 12 or more may be employed, depending on the application. For fabrics which are intended to the worn against the skin, for example, a low denier fiber or filament is employed.

The film composition is preferably one that allows the film to become porous upon elongation. Suitable film compositions are described in U.S. Pat. No. 3,870,593 incorporated herein by reference. Finely divided particles of an inorganic substance such as calcium carbonate are dispersed into a suitable thermoplastic polymer. The filled polymer is then formed into a film by a heat forming process such as extrusion. This provides a film, which upon stretching, will induce an interconnecting porous structure into the film, whereby the film is rendered porous (i.e., microporous or macroporous, preferably microporous) without removing the particles from the film.

The preferred amount of pore-nucleating agent is in excess of five percent by weight of the polymer, preferably in the range of 20 to 75 percent, and most preferably 40 to 70 percent. The size of the pore-nucleating agent can range from colloidal to 250 microns depending on the desired pore size. For microporous films, the size is preferably less than 30 microns. While calcium carbonate is preferred because of low cost, many other inorganic, non-hygroscopic and water insoluble salts can be employed.

Suitable polymers for forming the film include polyolefins and others such as vinyls and polyurethanes. The thickness of the film prior to elongation will be in the order of 1.5 to about 5 mils, with the film, after elongation, having a thickness in the order of from about 0.5 to 2.0 mils. Other agents in minor amounts may be added to the polymer, such as thermoplastic rubber, plasticizer and the like.

As indicated above, a film of the thermoplastic polymer is preferably extrusion coated onto a moving web of the nonwoven fabric to make a laminate. The resulting laminate is heated and stretched, or elongated in the machine direction (long direction of the web), the cross machine direction, or both. Machine direction elongation is accomplished simply by heating the laminate to its softening temperature of at least the film and drawing the laminate between a nip of rotating rolls at a faster rate than the feed rate. Cross machine elongation is accomplished using a conventional enter frame having clips which grasp the sides of the heating laminate, with the clips gradually diverging. Such as apparatus is described in U.S. Pat. No. 2,945,283, incorporated herein by reference. A longitudinal stretching apparatus is described in U.S. Pat. No. 3,208,100 incorporated herein by reference.

The laminate is heated and stretched or elongated sufficiently until the film layer becomes microporous and has a water vapor transmission rate of greater than 500 grams per square meter per day and a hydrohead in excess of 65 cm. The hydrohead test determines the height of water (in centimeters) which the laminate will support before a predetermined amount of liquid will pass through, and is defined in Federal Test Standard No. 19A, Method 5514. The water vapor transmission rate (WVTR) of fabrics is specified in ASTM Standard Test Method E-96-80.

Surprisingly, it has been found that a much lower degree of elongation of the film-fabric laminate is required to render the film microporous than in the case of the film alone. In the case of films, it is generally considered that in excess of a 150 percent elongation is required. When a film-fabric laminate is employed, initial test results indicate that elongation of a minimum of only 30–60 is required. This allows a variety of types of fabrics to be used which have higher melting points than the film, as long as the fabric is capable of elongation. Also, elongation is required in only one direction.

In addition to laminates consisting of single film and fabric layers, many other variations are possible. For example, the laminate may contain a central layer of film and two outer layers of fabric.

In general, the equipment used to elongate the laminate is capable of stretching or elongation of the web in the machine and cross machine directions up to 500–700% of the original web dimension. From preliminary tests, however, elongation of the laminate in excess of 30–60 percent may be sufficient to achieve the desired properties. For example, a polyethylene resin containing 50% by weight calcium carbonate and 5% by weight thermoplastic rubber was extrusion coated on a variety of polypropylene nonwoven fabrics, including fabrics made from carded fibers and spunbond fabrics. The laminates were hot stretched or elongated 50% in the machine direction. This resulted in a WVTR in all samples in the order of 940–3490 compared to a starting WVTR of less than 400. The hydrohead in both the unstretched and stretched samples remained high, in excess of 65 cm.

It will be appreciated that the simultaneous elongation of the fabric and film laminate will cause a reduction in the basis weight of the fabric as well as a reduction in the thickness of the film. For example, at a 50% elongation or 1.5 to 1.0 draw ratio, a 30 grams per square meter fabric having a 3 mil (0.003 inch) film layer will be converted to a 20 gsm fabric having a 2 mil film layer. At a 3:1 draw ratio, the final product would have a 10 gsm fabric and a 1 mil layer of film.

What is claimed is:

1. Method for making a breathable fabric and film laminate, said method comprising the steps of providing a web of a fabric, laminating a thermoplastic film onto said web of fabric to form a film and fabric laminate, said film being rendered microporous upon heating and permanent elongation, and then heating and permanently elongating said film and fabric laminate to permanently increase the size of said laminate and to render said film microporous.

2. The method of claim 1 wherein said fabric and film comprise a polyolefin polymer.

3. The method of claim 1 wherein the laminate is elongated less than 150 percent.

4. The method of claim 1 wherein said thermoplastic film comprises a pore forming filler.

5. The method of claim 1 wherein said web comprises a nonwoven fabric of fibers.

6. The method of claim 1 wherein said web comprises a nonwoven fabric of continuous filaments.

7. The method of claim 1 wherein said elongated laminate has a water vapor transmission rate of greater than 500 grams per square meter per day and a hydrohead in excess of 65 cm.

8. Method for making a water impermeable, vapor permeable nonwoven fabric, said method comprising the steps conveying a web of bonded nonwoven fabric, laminating a thermoplastic film to said nonwoven fabric to form a film-fabric laminate, said film comprising from about 40 to about 70 percent by weight of a pore-nucleating agent, heating said laminate to the softening point of said film, and permanently elongating said laminate at least by 40% to render said thermoplastic film microporous.

* * * * *